United States Patent [19]

Eikenberry et al.

[11] Patent Number: 5,353,008

[45] Date of Patent: Oct. 4, 1994

[54] HEADGEAR WITH SAFETY LIGHT

[75] Inventors: Michael G. Eikenberry; Richard Stants, both of Kokomo; William Baker, Indianapolis; Raymond G. Benson, Jr., Plainfield, all of Ind.

[73] Assignee: Adonis Incorporated, Kokomo, Ind.

[21] Appl. No.: 169,973

[22] Filed: Dec. 20, 1993

Related U.S. Application Data

[63] Continuation of Ser. No. 877,296, May 1, 1992, abandoned.

[51] Int. Cl.⁵ ............................................. B60Q 1/44
[52] U.S. Cl. .................................. 340/479; 340/432;
340/438; 362/72; 362/226; 2/422; 2/906;
65/106
[58] Field of Search ............... 340/479, 432, 539, 321,
340/455, 425.5, 438; 362/72, 103, 106, 105, 226;
2/199; 65/106

[56] References Cited

U.S. PATENT DOCUMENTS

| | | | |
|---|---|---|---|
| 3,825,742 | 7/1974 | Levin | 65/106 |
| 4,559,586 | 12/1985 | Slarve | 340/479 |
| 4,760,373 | 7/1988 | Reilly . | |
| 4,808,968 | 2/1989 | Caine | 340/479 |
| 4,891,736 | 1/1990 | Gouda . | |
| 4,893,356 | 1/1990 | Waters | 2/199 |
| 4,945,458 | 7/1990 | Batts et al. . | |
| 4,956,752 | 9/1990 | Foglietti . | |
| 5,040,099 | 8/1991 | Harris . | |
| 5,177,810 | 1/1993 | Minton et al. | 2/199 |

FOREIGN PATENT DOCUMENTS 2726322  6/1977  Fed. Rep. of Germany .
2619947 10/1977  Fed. Rep. of Germany .

OTHER PUBLICATIONS

Safe-Lite Owners' Manual, Todd Industries, Inc., 1989.

Primary Examiner—John K. Peng
Assistant Examiner—Nina Ting
Attorney, Agent, or Firm—Foley & Lardner

[57] ABSTRACT

A motorcycle helmet with a brake light includes a duty cycled receiver circuit for receiving a radio frequency (RF) signal from a transmitter located on the motorcycle. The receiver circuit is generally turned off if the RF signal is not present. When the receiver detects the RF signal, the receiver is turned on. The brake light is illuminated when the receiver receives the RF signal. The brake light includes LEDs for providing light. The lens is a plastic lens which provides superior performance having spherical indentations on an interior surface.

20 Claims, 4 Drawing Sheets

HEADGEAR WITH SAFETY LIGHT

This is a continuation of application Ser. No. 07/877,296 filed May 1, 1992 abandoned.

BACKGROUND OF THE INVENTION

The present invention relates generally to headgear including a warning device. More specifically, the present invention relates to a headgear including a light for communicating the presence or action of the person wearing the headgear.

In a preferred embodiment, the invention relates to a motorcycle helmet including a brake light. The helmet is described herein with reference to a motorcycle operator and a brake light, however, the invention is not so limited. The invention is, in fact, applicable in any application where a safety device may be mounted on articles worn by an operator. Presently, motorcycle brake lights are mounted to the rear fender of the motorcycle. This placement of the brake light is too close to the ground to be readily seen by the operators of other motor vehicles.

In order to make motorcycle brake lights easier to see, U.S. Pat. No. 4,760,393, issued to Reilly on Jul. 26, 1990 discloses a brake light mounted to the motorcycle helmet. The apparatus disclosed in the Reilly reference operates as follows. When the brake pedal is depressed, a switch is closed. A transmitter produces an encoded signal in response to the closed switch. A receiver inside the motorcycle helmet receives the encoded signal. A binary decoder inside the receiver demodulates and decodes the signal. If the decoded signal matches a predetermined code, the decoder turns on the brake light mounted inside the helmet.

Heretofore, prior art motorcycle helmets with brake lights have been found to be disadvantageous because the battery which powers the circuits and brake light in the helmet is drained too quickly. Particularly, the receiver circuit and the brake light require a significant current to accurately produce a visible brake signal. Thus, there is a need for a motorcycle helmet with a brake light which requires reduced power to produce an effective brake signal.

SUMMARY OF THE INVENTION

The present invention relates to a helmet. The helmet includes a power source, a duty cycled receiver circuit, and a light source. The duty cycled receiver circuit produces a light control signal in response to an external signal. The light source produces light in response to the light control signal.

The invention also relates to a headgear including a light source means. A receiver means provides a brake signal in response to a transmitted signal. The light source means which is coupled to a battery means provides light in response to the brake signal. A lens having indentations on an inside surface is mounted near the light source means.

The invention further relates to a safety system for use with a vehicle. The system includes a helmet having a brake signal indicator, a transmitter, a receiver, and a pulse signal means. The transmitter produces an RF signal in response to a brake operation. The pulse signal means provides a pulse signal to a receiver means. The receiver means produces a control signal in response to the RF signal. The brake signal indicator provides indicia in response to the control signal.

BRIEF DESCRIPTION OF THE DRAWINGS

The preferred exemplary embodiment of the present invention will hereinafter be described in conjunction with the appended drawings, wherein like designations denote like elements, and.

DETAILED DESCRIPTION OF PREFERRED EXEMPLARY EMBODIMENTS OF THE PRESENT INVENTION

Figure 1:
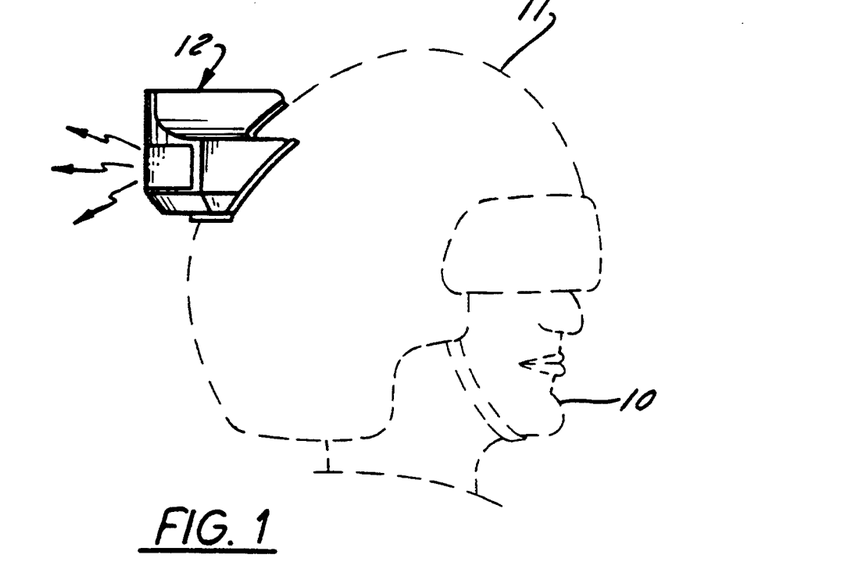
FIG. 1 is a drawing of a preferred exemplary embodiment of the present invention.

With reference to FIG. 1, a drawing of a preferred exemplary embodiment of the present invention includes a light attachment 12 mounted on a motorcycle helmet 11. Although helmet 11 is shown as a motorcycle helmet, helmet 11 may be a bicycle helmet or other article worn while riding a bicycle or other vehicle, or while participating in other activities. An operator 10 wears helmet 11 when riding a motorcycle (not shown). Helmet 11 may be any headgear, protective article or other safety equipment. Preferably, helmet 11 is a standard motorcycle helmet such as a BELL ® or other brand as is well known in the art.

Figure 2:
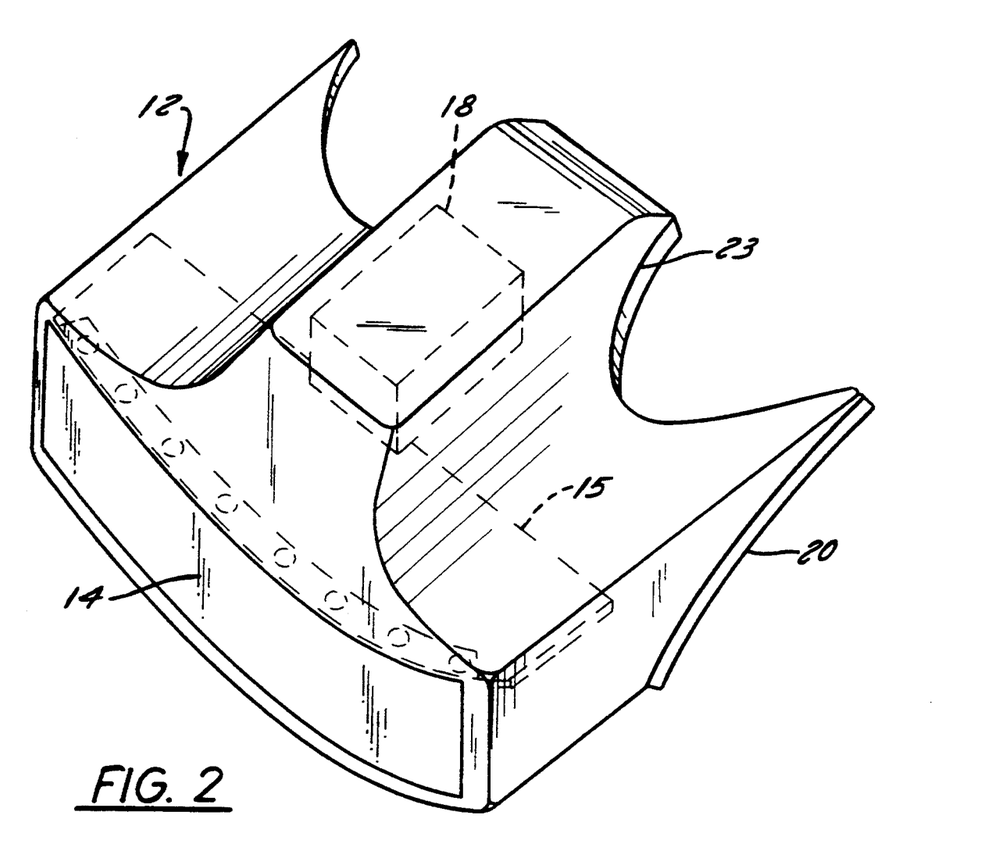
FIG. 2 is a more detailed drawing of the preferred exemplary embodiment of the present invention.

With reference to FIG. 2, a more detailed drawing of an attachment 12 in accordance with the preferred exemplary embodiment of the present invention includes a battery 18, an adhesive 20, a receiver 15, and a light 14. Attachment 12 is generally a device for holding the various components including battery 18, adhesive 20, receiver 15, and light 14. Preferably, attachment 12 includes a battery door. Attachment 12 is mounted on helmet 11 by means of adhesive 20. A side 23 of attachment 12 corresponds to the shape of helmet 11.

Preferably, adhesive 20 includes two rubber pads (not shown). The two rubber pads have adhesives or other glue-like substances on a first side and a second side. The first side of the rubber pads adheres to side 23 of attachment 12 which corresponds to external surface 23. The second side of the rubber pads also includes a paper backing. By removing the paper backing, an adhesive for sticking to the surface of helmet 11 is exposed. Attachment 12 is preferably mounted on the back or rear of helmet 11 so that a vertical center line of helmet 11 is matched to a vertical center line of attachment 12.

By pressing attachment 12 firmly onto helmet 11, the adhesive substance on the rubber pads hold attachment 12 to helmet 11. Preferably, adhesive 20 is of sufficient strength to hold attachment 12 to helmet 11 through most motorcycling conditions. Preferably, adhesive 20 is a foam mounting tape such as SLE-41-9485, ¼" neoprone foam manufactured by 3M. Generally, adhesive 20 may be replaced with mechanical or other means for holding attachment 12 on helmet 11.

Figure 3:
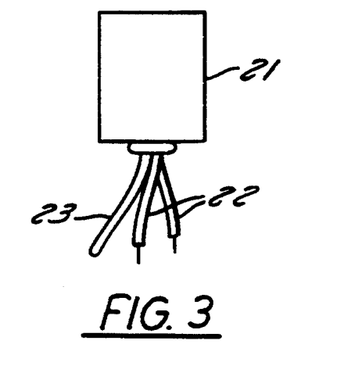
FIG. 3 is a drawing of a transmitter associated with the preferred exemplary embodiment of the present invention.

With reference to FIG. 3, a transmitter 21 in accordance with the preferred exemplary embodiment of the present invention includes leads 22 and antenna 23. Transmitter 21 should be installed on the back of the motorcycle (not shown) so that antenna 23 is not obstructed by any metal object. Thus, an unobstructed straight line should be provided between antenna 23 and attachment 12. Preferably, transmitter 21 is mounted to the motorcycle by means of an adhesive (not shown). The adhesive is generally similar to adhesive 20.

Leads 22 are wires that should be coupled to the rear lights of the motorcycle and grounded to the motorcycle frame. Preferably, a first wire is coupled to a first terminal on the rear brake light (not shown) on the motorcycle. A second wire is coupled to the motorcycle frame; the second wire provides a ground for the transmitter. Thus, when power is provided to the brake light, power is provided to transmitter 21 through leads 22. This interconnection to the brake light is advantageous because exterior switches to a brake handle or a brake pedal are not required. However, if transmitter 21 is used with a bicycle or another application which does not utilize a brake light, a switch must be configured to provide transmitter 21 a signal in response to a braking operation.

Figure 4:
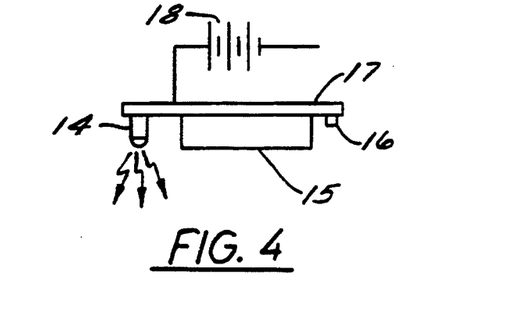
FIG. 4 is a drawing of a receiver associated with the preferred exemplary embodiment of the present invention.

With reference to FIG. 4, a drawing of a receiver 15 in accordance with the preferred exemplary embodiment of the present invention is coupled to circuit board 17. Preferably, battery 18, antenna 16, circuit board 17, and receiver 15 are located in attachment 12. Battery 18 provides power to the various components associated with receiver 15. Particularly, circuit board 17 and light 14 are powered by battery 18. Preferably, battery 18 is a 9-volt battery, although receiver 15 and light 14 could be designed to use other battery sizes. Battery 18 may also be coupled to a solar cell (not shown). The solar cell may be configured to charge battery 18 as is well known in the art. Preferably, the solar cell is mounted to the top of helmet 18.

Figure 5A:
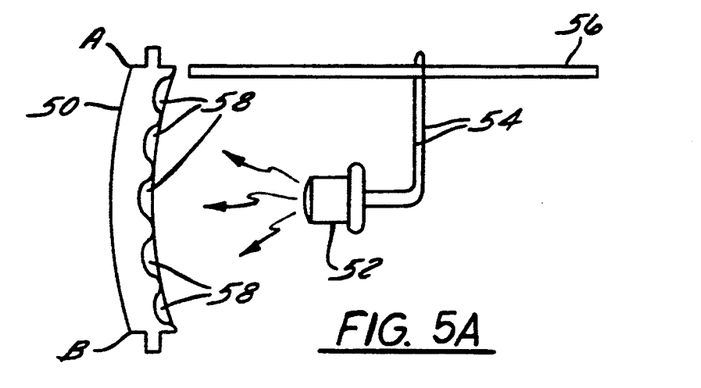
FIG. 5A is a side view drawing of a lens associated with the preferred exemplary embodiment of the present invention.

With reference to FIG. 5A, a lens 50 in accordance with the preferred exemplary embodiment of the present invention includes a plurality of spherical indentations 58. Preferably, lens 50 is made of a plastic having an index of reflection of approximately 1.5. Lens 50 is formed of plastic in an injection molding process as is well known in the art. Spherical indentations 58 are made by an end mill as is well known in the art. Spherical indentations 58 are preferably 0.032 inches deep and have a 0.1667 inch diameter. Preferably, spherical indentations 58 are arranged in five rows; each row is spaced 0.1643 inches apart. Each spherical indentation 58 is spaced 0.1643 inches apart from the next spherical indentation 58 in its row.

Lens 50 has a height of approximately 0.95 inches. An outside surface of lens 50 from a point A to a point B is an arc of a circle having a radius of approximately 3.55 inches.

LEDs 52 are super bright LEDs such as the HB8100 LED manufactured by Hewlett-Packard. LEDs 52 are electrically coupled to circuit board 56 via conductors 54. Conductors 54 are bent at a right angle so that LEDs 52 are 0.5 inches from circuit board 56.

Figure 5B:
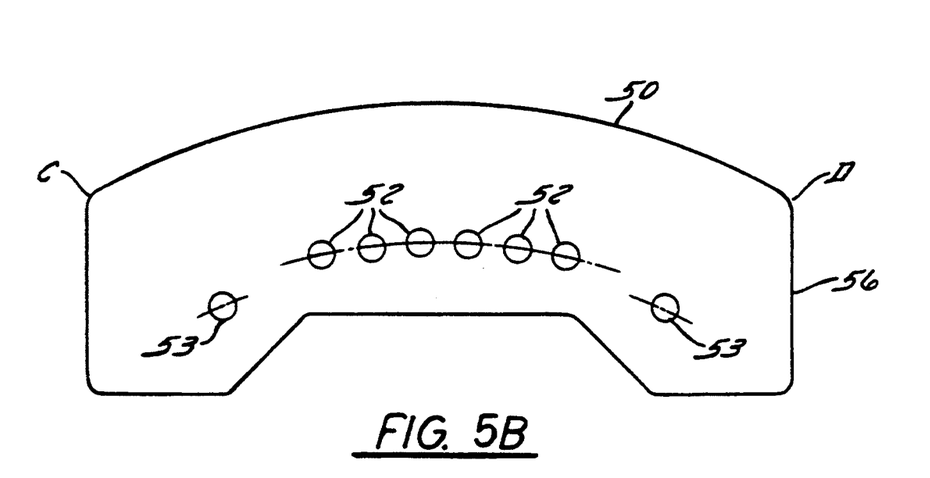
FIG. 5B is a top view drawing of LEDs associated with the preferred exemplary embodiment of the present invention.

With reference to FIG. 5B, a top view of circuit board 56 includes LEDs 52 in accordance with the preferred exemplary embodiment of the present invention. The outside surface of lens 50 from a point C to a point D preferably is an arc of a circle having a radius of approximately 4.957 inches. Circuit board 56 may be integral with circuit board 17.

LEDs 52 are spaced approximately 11/32 inch apart along an arc of a circle having an approximately 4.04 inch radius. LEDs 53 are situated along an arc of a circle having an approximate 3.97 inch radius, and LEDs 53 are 11/16 of an inch from the closest LED 52. Lens 50 is situated on a 4.957 radius approximately 15/16 of an inch from LEDs 52 and 1 1/16 inch from LEDs 53. The arcs associated with lens 50, LEDs 52 and LEDs 53 are concentric.

The arrangement of LEDs 52 and LEDs 53 and lens 50 provides optimum light transmission. Spherical indentations 58 spread out light from LEDs 52 and the exterior surface of lens 50 focuses the light from LEDs 52. Light emitted from lens 50 may be seen from approximately 300 feet away. Thus, lens 50 provides an advantageous means of providing optimum light visibility.

Figure 6:
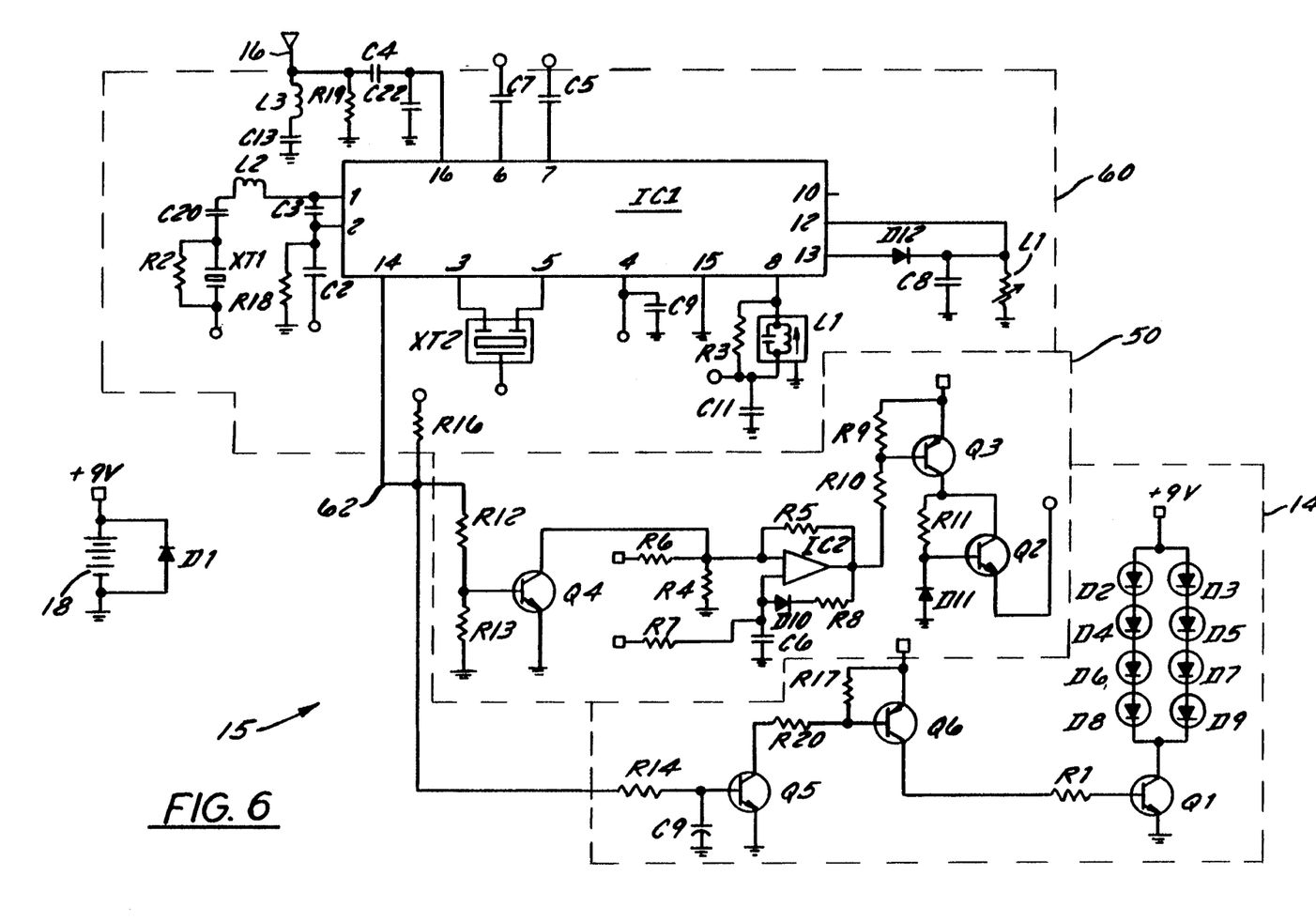
FIG. 6 is a detailed electrical schematic of the receiver associated with the preferred exemplary embodiment of the present invention.

With reference to FIG. 6, a detailed schematic of a receiver 15 in accordance with the preferred exemplary embodiment of the present invention includes receiver control circuit 60, duty cycle generator 50, battery 18, and light 14. Receiver 15 is preferably a duty cycled receiver which is powered by duty cycle generator 50. Duty cycle generator 50 is a pulse signal generator circuit for providing a low power mode for receiver 15. Receiver control circuit 60 is an RF receiver circuit for receiving an external signal from transmitter 21. Although control circuit 60 and transmitter 21 could be designed to communicate through various media such as light or sound, receiver control circuit 60 preferably receives a radio frequency (RF) signal produced by transmitter 21.

Receiver control circuit 60 is coupled to duty cycle generator 50 via a conductor 62. Receiver control circuit is provided a pulsed +5 V signal by duty cycle generator 50 at various connections shown in FIG. 6. Receiver control circuit 60 is also coupled to light 14 via conductor 62. Battery 18 provides a +9 V signal to duty cycle generator 50 and light 14.

Duty cycle generator 50 includes a resistor R13, a transistor Q4, a resistor R6, a resistor R7, a resistor R4, a capacitor C6, a diode D10, a resistor R8, a resistor R5, an amplifier IC2, a resistor R10, a resistor R9, a transistor Q3, a resistor R11, a diode D11, and a transistor Q2. A first end of resistor R12 is coupled to conductor 62. A second end of resistor R12 is coupled to a first end of resistor R13 and the base of transistor Q4. A second end of resistor R13 is coupled to ground. The emitter of transistor Q4 is coupled to ground, and the collector of transistor Q4 is coupled to a first end of resistor R4.

The +9 V signal is coupled to a first end of resistor R6, and a second end of resistor R6 is coupled to the first end of resistor R4. The second end of resistor R4 is coupled to ground. The first end of resistor R4 is coupled to the positive terminal of amplifier IC2 and a first end of resistor R5. A second end of resistor R5 is coupled to the output of amplifier IC2, a first end of resistor R10 and a second end of resistor R8. A first end of resistor R8 is coupled to the cathode of diode D10. The anode of diode D10 is coupled to the negative terminal of amplifier IC2, a first end of capacitor C6, and a second end of resistor R7. A second end of capacitor C6 is coupled to ground. A first end of resistor R7 is coupled to the +9 V signal.

A second end of resistor R10 is coupled to the base of transistor Q3 and a first end of resistor R9. The +9 V signal is coupled to a second end of resistor R9 and the emitter of capacitor Q3. The collector of transistor Q3 is coupled to a first end of resistor R11 and the collector of transistor Q2. A second end of resistor R11 is coupled to the base of transistor Q2 and the anode of diode D11. The cathode of diode D11 is coupled to ground. The emitter of transistor Q2 provides the pulsed +5 V signal.

Receiver control circuit 60 includes a potentiometer 61, a capacitor C8, a diode D12, a coil L1, a resistor R3, a capacitor C11, a capacitor C9, a crystal XT2, a resistor R16, a capacitor C2, a capacitor C3, an inductor L2, a capacitor C20, a resistor R2, a crystal XT1, a capacitor C22, a capacitor C4, a capacitor C5, a capacitor C7, an inductor L3, a capacitor C13, a resistor R19, and a resistor R18. Receiver control circuit 60 also includes integrated chip IC1 and antenna 16.

Antenna 16 is coupled to a first end of inductor L3, a first end of resistor R19, and a first end of capacitor C7. A second end of inductor L3 is coupled to a first end of capacitor C13, and a second end of capacitor C13 is coupled to ground. A second end of resistor R19, a first end of capacitor C22, and a second end of capacitor C22 are coupled to ground. A first end of capacitor C22 is coupled to a second end of capacitor C4 and a pin 16 of integrated circuit IC1.

A pin 16 of integrated circuit IC1 is coupled to a second end of capacitor C7. A first end of capacitor C7 and a first end of capacitor C5 are coupled to the pulsed +5 V signal. A second end of capacitor C5 is coupled to a pin 7 of chip IC1. A pin 12 of chip IC1 is coupled to a first end of potentiometer 61, the cathode of diode D12, and a first end of capacitor C8. The anode of diode D12 is coupled to a pin 13 of chip IC1. A second end of capacitor C8 and a second end of potentiometer 61 are coupled to ground.

A pin 8 is coupled to a first end of a resistor R3. A second end of coil L1 is coupled to a first end of capacitor C11. A second end of capacitor C11 is coupled to ground. A second end of resistor R3 and a first end of capacitor C11 is coupled to the pulsed +5 V signal. A pin 15 on chip IC1 is coupled to ground on chip IC1.

A second end of capacitor C9 is coupled to ground and a first end of capacitor C9 is coupled to a pin 4 of chip IC1. A pin 4 of chip IC1 is also coupled to the pulsed +5 V signal. A first pin on crystal XT2 is coupled to the pulsed +5 V signal, and a second pin on crystal XT2 is coupled to a pin 3 of chip IC1. A third pin on crystal XT2 is coupled to a fifth pin on chip IC1.

A pin 14 of chip IC1 is coupled to conductor 62. A first end of resistor R18 is coupled to the pulsed +5 V signal. A second end of resistor R16 is coupled to conductor 62.

A first end of capacitor C2 is coupled to the pulsed +5 V signal. A second end of capacitor C2 is coupled to a pin 2 of chip IC1, a first end of capacitor C3, and a first end of resistor R18. A second end of resistor R18 is coupled to ground. A second end of capacitor C3 is coupled to a first pin of chip IC1 and a first end of inductor L2. A second end of inductor L2 is coupled to a first end of capacitor C20. A second end of capacitor C20 is coupled to a first end of crystal XT1 and a first end of resistor R2. A second end of resistor R2 and a second end of crystal XT1 are coupled to the pulsed +5 V signal.

Battery 18 provides the +9 V signal. The anode of diode D1 is coupled to ground and the cathode of diode D1 is coupled to the +9 V signal.

Light 14 is a light source including a diode D2, a diode D3, a diode D4, a diode D5, a diode D6, a diode D7, a diode D8, and a diode D9. Light 14 also includes a transistor Q1, a resistor R1, a transistor Q6, a resistor R17, a resistor R20, a transistor Q5, a capacitor C9, and a resistor R14. A first end of resistor R14 is coupled to conductor 62. A second end of resistor R14 is coupled to a first end of capacitor C9 and the base of transistor Q5. A second end of capacitor C9 is coupled to ground. The emitter of transistor Q5 is coupled to ground. The collector of transistor Q5 is coupled to a first end of resistor R20.

A second end of resistor R20 is coupled to a first end of resistor R17 and the base of transistor Q6. A second end of resistor R17 is coupled to the +9 V signal and the emitter of transistor Q6. The collector of transistor Q6 is coupled to a first end of resistor R1.

A second end of resistor R1 is coupled to the base of transistor Q1. The collector of transistor Q1 is coupled to the cathode of diode D8. The anode of diode D8 is coupled to the cathode of diode D6. The anode of diode D6 is coupled to the cathode of diode D4. The anode of diode D4 is coupled to the cathode of diode D2. The anode of diode D2 is coupled to the +9 V signal. The +9 V signal is also coupled to the anode of diode D3. The cathode of diode D3 is coupled to the anode of diode D5. The cathode of diode D5 is coupled to the anode of diode D7. The cathode of diode D7 is coupled to the anode of diode D6. The cathode of diode D6 is coupled to the collector of transistor Q1. The emitter of transistor Q1 is coupled to ground. Diodes D2, D3, D4, D5, D6, D7, D8 and D9 are light emitting diodes (LEDs). LEDs D2, D3, D4, D5, D6, D7, D8, and D9 are preferably arranged as LEDs 52 and 53 discussed with reference to FIGS. 4A and 4B.

Figure 7:
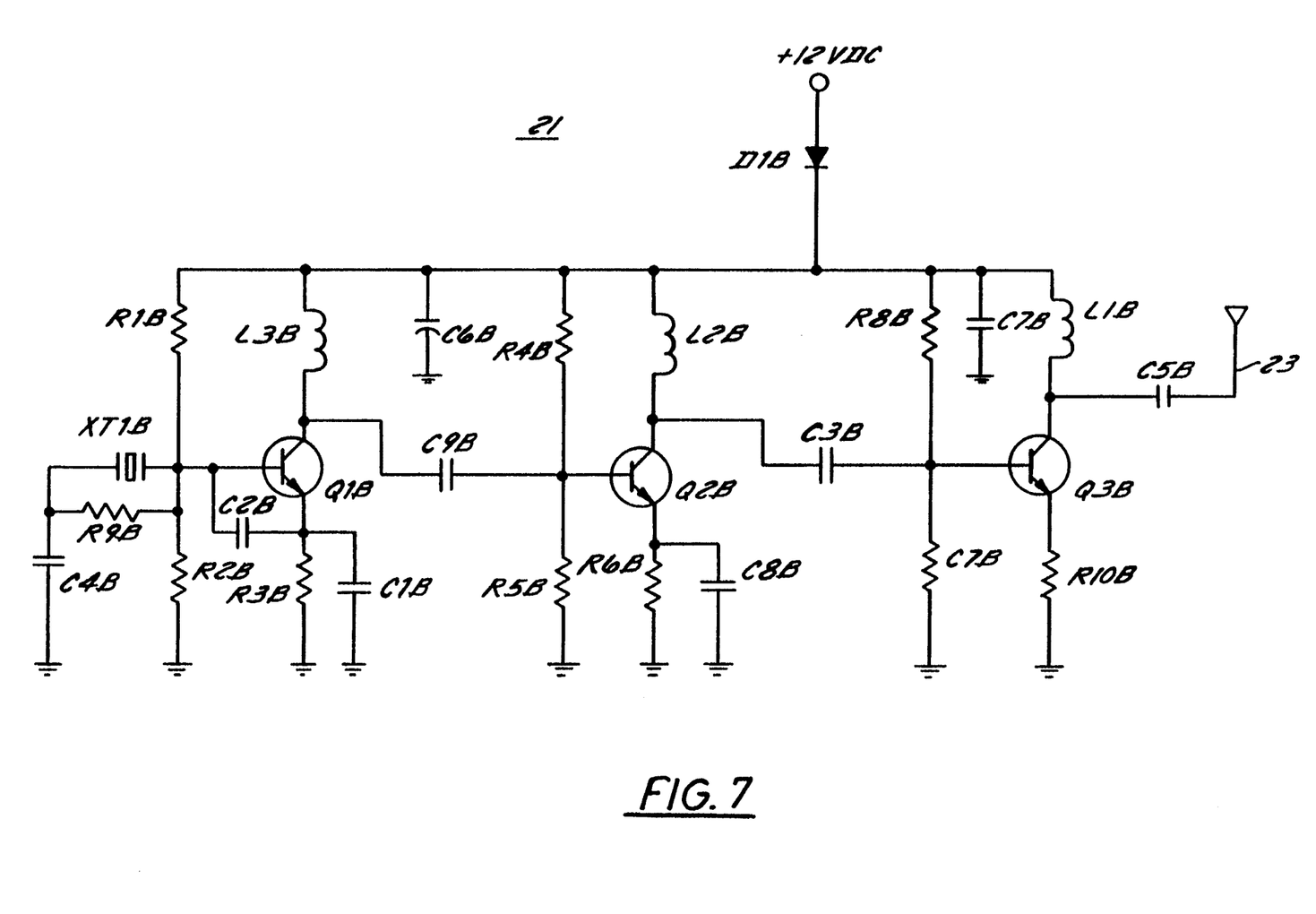
FIG. 7 is a detailed electrical schematic of the transmitter associated with the preferred exemplary embodiment of the present invention.

With reference to FIG. 7, transmitter 21 in accordance with the preferred exemplary embodiment of the present invention is coupled to antenna 23. Transmitter 21 provides an approximately 40 MHz RF signal when a +12 V signal is provided. Preferably, leads 22 provide transmitter 21 a +12 VDC signal when the motorcycle brake light is ON.

Transmitter 21 includes a diode D1B, a resistor R1B, an inductor L3B, a capacitor C6B, a resistor R4B, an inductor L2B, a resistor R8B, a capacitor C7B, an inductor L1B, a capacitor C5B, a transistor Q3B, a resistor R7B, a capacitor C3B, a transistor Q2B, a capacitor C8B, a resistor R6B, a resistor R5B, a capacitor C9B, a transistor Q1B, a capacitor C1B, a resistor R3B, a capacitor C2B, a resistor R2B, a resistor R9B, a capacitor C4B, and a crystal XT1B. Antenna 23 is coupled to a first end of capacitor C5B. A second end of capacitor C5B is coupled to the collector of transistor Q3B and a first end of inductor L1B. The emitter of transistor Q3B is coupled to ground.

A second end of inductor L1B is coupled to a first end of capacitor C7B, the cathode of diode D1B, a first end of resistor R8B, the second end of inductor L1B a first end of inductor L2B, a first end of resistor R4B, a first end of capacitor C6B, a first end of inductor L3B, and a first end of resistor R1B. A second end of capacitor C7B is coupled to ground. A second end of resistor R8B is coupled to the base of transistor Q3B and a first end of capacitor C3B and a first end of resistor R7B. A second end of resistor R7B is coupled to ground. A second end of capacitor C3B is coupled to a second end of inductor L2B and the collector of transistor Q2B. The emitter of transistor Q2B is coupled to a first end of resistor R6B and a first end of capacitor C8B. A second end of capacitor C8B and a second end of resistor R6B are coupled to ground. A second end of resistor R4B is coupled to the base of transistor Q2B, a first end of resistor R5B and a first end of capacitor C9B. A second end of resistor R5B and a second end of capacitor C6B are coupled to ground.

A second end of inductor L3B is coupled to the collector of transistor Q1B and a second end of capacitor C9B. The emitter of transistor Q1B is coupled to a first end of resistor R3B, a second end of capacitor C2B and a first end of capacitor C1B. A second end of resistor R3B and a second end of capacitor C1B are coupled to ground. A second end of resistor R1B is coupled to the base of transistor Q1B, a first end of capacitor C2B, a first end of crystal XT1B, a first end of resistor R9B, and a first end of resistor R2B. A second end of resistor R2B is coupled to ground. A second end of crystal XT2B is coupled to a first end of capacitor C4B and a first end of resistor R9B. A second end of resistor R9B is coupled to ground. The anode of diode D1B is coupled to the +12 V signal. The +12 V signal is zero volts when the brake is not depressed and +12 V when the brake is depressed. This is accomplished by coupling the proper one of leads 22 to the proper terminal of the brake light (not shown) on the motorcycle. When the brake pedal is depressed, the terminal is provided +12 V by the motorcycle and the brake light (not shown) is illuminated. Thus, whenever the brake is depressed, a +12 V signal is provided to transistor 21.

With reference to FIGS. 6 and 7, the operation of a system including receiver 15 and transmitter 21 are described as follows. The preferred values of the various circuit components associated with transmitter 21 and receiver 15 are given in Table I. Preferably, chip IC1 is a low power narrow band FM receiver such as an MC3371.

As discussed above, transmitter 21 is connected to the brake light (not shown) of the motorcycle so that a +12 V power source is provided to the anode of diode D1B when the brake light is on. As is known in the art, the motorcycle (not shown) turns the brake light on in response to a brake operation. Diode D1B provides reverse polarity protection and capacitor C6B0 is an electrolytic capacitor for providing power filtering operations.

Transmitter 21 preferably utilizes a crystal controlled oscillator for frequency stability over a wide operating temperature range. Preferably, transmitter 21 utilizes a Colpitts oscillator including transistor Q1B, capacitors C1B, C2B and C4B, and 40.680 MHz crystal XT1B with bias resistors R1B, R2B and R3B. Inductor L3 is used for impedance matching and oscillator tuning to attenuate unwanted signals. Thus, transmitter 21 includes a resonant or tuned oscillator circuit for generating a 40.68 MHz signal. This 40.68 MHz signal is then amplified by a pre-amp stage consisting of transistor Q2B, with bias resistors R4B, R5B and R6B. Capacitor C8B is used for swamping the emitter of Q2B (increasing AC gain while not increasing DC emitter current.) Inductor L2B is used for impedance matching and tuning to attenuate unwanted signals. The output of this pre-amp stage (taken from the collector of Q2B) is then coupled by capacitor C3B to the power amplifier consisting of resistors R7B, R8B, and R10B, and inductor L1B and transistor Q3B before being coupled to antenna 23 via capacitor C5B.

The collector of transistor Q2B provides a 40 MHz signal to the base of transistor Q3B. Capacitor C3B couples the collector of transistor Q2B to the base of transistor Q3B. Transistor Q3B, resistor R8B, resistor R7B, capacitor C7B, inductor L1B, and capacitor C5B operate to provide a power amplifier. The 40 MHz signal at the base of transistor Q3B is amplified and provided to antenna 23.

Although transmitter 21 is shown utilizing a Colpitts oscillator, various oscillators could be used. Further, although transistor 21 utilizes a crystal XT1B, other sources of signal generation may be used. Further, other designs of transmitter 21 are known in the art which could be used to provide a signal to antenna 23. Therefore, transmitter 21 operates to provide an approximately 40 MHz electromagnetic signal which is radiated by antenna 23 when a +12 V power source is provided by the brake light on the motorcycle (not shown).

With reference to FIG. 6, receiver control circuit 60 is not constantly provided power. Receiver control circuit 60 is powered by the pulsed +5 V signal. The pulse +5 V signal is provided by duty cycle generator 50. Thus, receiver 15 is a duty cycled receiver circuit.

Conductor 62 is a logic low (approximately ground) when receiver control circuit 60 is not provided power by the pulse +5 V signal or when an external signal such as the RF signal from transmitter 21 is not provided to receiver 15. When conductor 62 is at a logic low, transistor Q4 is OFF.

When transistor Q4 is OFF, amplifier IC2 preferably provides duty cycle signal at the output of amplifier IC2. Amplifier IC2 is preferably configured as a comparator for providing a 0 to 9 volt signal. Preferably, the resistor R7, capacitor C6 and resistor R8 provide RC values so that the signal at the output of amplifier IC2 is approximately 0 VDC for approximately 0.13 seconds and approximately +9 VDC for approximately 0.02 seconds. This configuration provides an approximately 7 Hz signal at the output of amplifier IC2. Duty cycle generator 50 may be designed to provide various other duty cycles. Preferably the duty cycle is from approximately 1% to 50%.

Transistor Q3 is turned OFF in response to a +9 V signal at the output of amplifier IC2. Transistor Q3 is also turned ON in response to a 0 volt signal provided at the output of amplifier IC2. Thus, the collector of transistor Q3 provides an approximately 8.3 volt signal when the voltage at the output of amplifier IC2 is low and provides an approximately 0 V signal when the output of amplifier IC2 is high. When the collector of transistor Q3 is approximately +8.3 VDC, transistor Q2 provides an approximately +5 V signal at the emitter of transistor Q2. When the voltage at the collector of transistor Q3 is approximately 0 V, the emitter of transistor Q2 provides an approximately 0 V signal.

Diode D11 is a 5.6 V zener diode. Diode 11 provides a stable 5.6 V signal for the base of transistor Q2. Thus, the emitter of transistor Q2 provides a 0.02 second 5 V signal followed by an approximately 0.13 second 0 V signal when conductor 62 is low.

Conductor 62 is high when the pulsed +5 V signal is at 5 volts and antenna 16 is receiving a 40.680 MHz±5 KHz RF signal. When conductor 62 is high, transistor Q4 is turned on. When transistor Q4 is turned on, the non-inverting input of amplifier IC2 is approximately 0 volts. When the non-inverting input is approximately 0 volts, the inverting input of amplifier IC2 is greater than the non-inverting input of amplifier IC2. Thus, when the non-inverting input of amplifier IC2 is 0 volts, the output of amplifier IC2 is approximately ground potential.

As discussed above, when the output of amplifier IC2 is 0 volts or approximately ground, transistor Q3 is turned on and transistor Q2 provides an approximately 5 volt signal at the emitter of Q2. This 5 volt signal at the emitter of transistor Q2 is the pulsed +5 V signal. Thus, when conductor 62 is high, the pulsed +5 V signal is held at +5 V. Thus, duty cycle signal generator 50 provides a duty cycled signal when conductor 62 is low and provides a constant 5 V signal when conductor 62 is high.

As discussed above, receiver control circuit 60 receives power from the pulsed +5 V signal. When the pulsed +5 V signal is approximately 5 V, chip IC1 is powered and ready to receive a RF signal at antenna 16.

Receiver control circuit 60 is coupled to antenna 16. Inductor L3, resistor R19, capacitor C13, capacitor C4 and capacitor C22 provide a network for receiving the RF signal from transmitter 21 and to filter out citizen band (CB) radio signals (27 MHz). The network including inductor L3, capacitor C4, and resistor R19 and chip IC1 at pin 16 are tuned to receive a particular frequency at antenna 16. Preferably, the network is tuned to receive a 40 MHz FM signal.

Chip IC1 mixes the signal at pin 16 with an intermediate frequency (IF) signal. The IF signal is provided by an internal oscillator and the network coupled to pins 1 and 2 of chip IC1. Particularly, inductor L2, capacitor C3, resistor R18, capacitor C2, capacitor C20, crystal XT1, and resistor R2 provide a 40.225 MHz IF signal. Preferably, chip IC1 includes an internally biased Colpitts oscillator with collector, base, and emitter connections at pins 4, 1, and 2 respectively. Chip IC1 outputs the signal from the internal mixer at pin 3.

The operation of the various circuit components coupled to receiver control circuit 60 are discussed throughout literature associated with chip IC1. The various interconnections between components associated with chip IC1 are generally well known in the art.

Pin 3 provides an output for the internal mixer. The signal at pin 3 of chip IC1 is filtered by crystal XT2 which is preferably a ceramic band pass filter for IF filtering. Preferably, crystal XT2 has a band width of ±5 KHz. Crystal XT2 provides a filtered signal to pin 5 of chip IC1.

Pin 5 of chip IC1 is coupled to a first input to a limiter IF amplifier which is internal to chip IC1. Thus, the limiter IF amplifier receives the signal from crystal XT2. The limiter IF amplifier provides a received strength signal indicator (RSSI) at pin 13. The RSSI signal is used to detect the presence of a carrier signal. Thus, when a carrier signal is present at antenna 16, pin 13 provides a signal.

The limiter amplifier has a second input coupled to capacitor C7. The first input of limiter IF amplifier is also coupled to capacitor C5 at pin 7. The internal limiter IF amplifier provides the RSSI signal in response to these inputs.

When pin 13 provides current source of 60 microamps, diode D12 conducts and capacitor C8 is charged. Thus, RSSI output provides a signal at pin 12 of chip IC1. If pin 12 is below 0.9 volts, pin 14 is internally shorted to ground. Thus, when pin 14 is shorted to ground, an approximately 0 volt signal is applied to conductor 62. Preferably, approximately 0.67 mv of hysteresis is provided at pin 12 to prevent jitter. Potentiometer 61 is a 1 meg potentiometer which allows the manufacturer or user to set the level at which pin 14 is brought to ground. Thus, potentiometer 61 provides a trigger level at which chip IC shorts conductor 62 to ground in response to the RSSI signal. Thus, when antenna 16 receives a strong enough carrier signal, the RSSI signal is provided through diode D12 and into pin 12 so that pin 12 is not below 0.9 volts and pin 14 is not shorted to ground. Therefore, when the signal at antenna 16 is not strong enough, sufficient current is not provided through diode D12 and the voltage at pin 12 is below 0.9 volts. When pin 12 is below 0.9 volts, pin 14 is shorted to ground. Potentiometer 61 and capacitor C8 provide an RC network for discharging the voltage level at pin 12.

An LCR tank circuit is coupled to pin 8. This LCR tank circuit consists of resistor R3, and LC tank circuit L1. The LCR tank circuit provides a 90 degree phase shift at the IF center frequency and enables recovered audio.

Light 14 is coupled to conductor 62 when conductor 62 is high. Resistor R14 provides current limiting to transistor Q5, and resistor R14 and capacitor C1 provide an RC time constant so that transistor Q5 remains off for a predetermined amount of time after conductor 62 goes high. This RC constant prevents improper flickering of light 14 in response to changing signals on conductor 62.

When transistor Q5 is turned on, transistor Q6 is turned on. When transistor Q6 is turned on, transistor Q1 is turned on. When transistor Q1 is turned on, current flows from battery 18 through diodes D2, D4, D6, and D8 and through diodes D3, D5, D7, and D9. When current flows through diodes D2, D3, D4, D5, D6, D7, D8, and D9, light is produced.

When conductor 62 is low, capacitor C1 is discharged through resistor 14 and transistor Q5 is turned off. When transistor Q5 is turned off, transistor Q6 is turned off. When transistor Q6 is turned off, transistor Q1 is turned off. When transistor Q1 is turned off, current does not flow from battery 18 through diodes D2, D4, D6, D8 and through diodes D3, D5, D7 and D9. Thus, when conductor 62 is low, light is not produced by diodes D2, D3, D4, D5, D6, D7, D8, and D9.

It will be understood that while various conductors are depicted in the drawings or figures, they are not so shown in a limiting sense and may comprise plural conductors/connectors as understood in the art. Further, various oscillators, frequencies, and transmitters may be used. The above description is of a preferred exemplary embodiment of the present invention and is not limited to the specific forms shown. For example, while the system was described with reference to radio frequency transmitters and receivers, various other transmitters and receivers could be used without departing from the spirit of the invention. Further, although a light source using LEDs was shown, various devices could be employed to provide indicia of the braking operation.

TABLE I

| | |
|---|---|
| C1 | 1 uf |
| C2 | 5 pf |
| C3 | 33 pf |
| C4 | 0.1 uf |
| C5 | 0.1 uf |
| C6 | 0.1 uf |
| C7 | 0.1 uf |
| C9 | 0.1 uf |
| C13 | 56 pf |
| C20 | 0.1 uf |
| C22 | 47 pf |
| C1B | 120 pf |
| C2B | 5 pf |
| C3B | .1 uf |
| C4B | 47 pf |
| C5B | .1 uf |
| C6B | 10 uf |
| C7B | .1 uf |
| C8B | .1 uf |
| D1 | 1N4001 |
| D2 | HP8001 |
| D3 | HP8001 |
| D4 | HP8001 |
| D5 | HP8001 |
| D6 | HP8001 |
| D7 | HP8001 |
| D8 | HP8001 |
| D9 | HP8001 |
| D10 | 1N4148 |
| D11 | 5.6 V zener |
| D12 | 1N4148 |
| D1B | 1N4001 |
| C11 | 0.1 uf |
| C8 | 0.1 uf |
| IC1 | MC3371 |
| IC2 | LM393 |
| L1 | TK2502 |
| L2 | 0.68 uH |
| L3 | 0.68 uH |
| L1B | 0.68 uH |
| L2B | 0.68 uH |
| L3B | 0.68 uH |
| Q1B | 2SC1674L |
| Q1 | 2N3904 |
| Q2 | 2N3904 |
| Q3 | 2N3906 |
| Q4 | 2N3904 |
| Q5 | 2N3904 |
| Q6 | 2N3906 |
| Q2B | 2N3904 |
| Q3B | 2SD1247 |
| R1 | 10K |
| R4 | 1M |
| R5 | 1M |
| R6 | 1M |
| R7 | 1.3M |
| R8 | 200K |
| R9 | 100K |
| R11 | 10K |
| R14 | 100K |
| R16 | 10K |
| R17 | 100K |
| R20 | 1K |
| R1B | 39K |
| R2B | 18K |
| R3B | 100 |
| R4B | 3.3K |
| R5B | 680 |
| R9B | 1K |
| R10B | 5.6 |
| R6B | 47 |
| R7B | 1.8K |
| R8B | 1.5K |
| XT1 | 40.225 MHz |
| XT2 | 455 KHz IF filter |
| XT1B | 40.680 MHz |
| Potentiometer 61 (VR1) | 1M |

All resistance values in Ohms.

What is claimed is:

1. An apparatus for use with a helmet or other article, comprising:
   a duty cycled receiver circuit including a duty cycle generator and a receiver control circuit, the receiver control circuit having a power input, the duty cycle generator having a power output coupled with the power input of the receiver control-circuit and the receiver control circuit having an antennae for receiving an external signal;
   a light source coupled to the duty cycled receiver circuit for receiving a light control signal;
   a power source terminal for coupling to a power source, the power source terminal coupled to the duty cycle generator;
   wherein the receiver control circuit produces the light control signal in response to a presence of the external signal and the light source produces light in response to the light control signal, the duty cycle generator providing a pulse signal at the power output in response to an absence of the external signal and providing a constant signal at the power output in response to the presence of the external signal, whereby power from the power source consumed by said receiver control circuit is reduced by powering the receiver control circuit with the pulse signal in response to the absence of the external signal.

2. The apparatus of claim 1 wherein the pulse signal is a 7 Hz signal having a duty cycle from 1 to 50%.

3. The apparatus of claim 1 wherein the duty cycle generator is coupled to receive the light control signal and the duty cycle generator provides a constant power signal to the power input of the receiver control circuit in response to the light control signal.

4. (Amended) The apparatus of claim 3 wherein the constant power signal signal is a DC signal.

5. The apparatus of claim 3 wherein the power source is a battery.

6. The apparatus of claim 1 further comprising a lens with spherical indentations.

7. Art apparatus for attachment to headgear, comprising:
   battery means for providing electric power;
   duty cycled receiver circuit including a duty cycle generator means coupled with the battery means and a control means for providing a brake signal, the duty cycle generator means for providing a low power mode, the duty cycle generator means having a power output providing the electric power, the control means having a power input coupled with the power output of duty cycle generator means for receiving the electric power, wherein the electric power is periodically removed from the power output in response to an absence of the transmitted signal, whereby power consumption of the control means is reduced by periodically removing the electric power from the power output;
   light source means, coupled to the battery means, for providing light in response to the brake signal; and
   lens mounted near the light source means.

8. The apparatus of claim 7 wherein:
   the duty cycle generator means provides a high power mode to the duty cycled receiver means in response to the transmitted signal.

9. The apparatus of claim 7 wherein the transmitted signal is a 40 MHz electromagnetic signal.

10. The apparatus of claim 7 further comprising an attachment means, wherein the attachment means is mounted on an outside surface of the headgear and the attachment means includes the light source means, and the lens.

11. The apparatus of claim 10, wherein the attachment means is mounted to the headgear with an adhesive means, wherein the adhesive means includes rubber pads.

12. The apparatus of claim 7, wherein the lens is made of plastic.

13. The apparatus of claim 7, wherein the light source means includes LEDs arranged along a circumference concentric with an exterior surface of the lens.

14. The apparatus of claim 7, wherein the lens is curved vertically and horizontally.

15. The apparatus of claim 7, further comprising a solar panel.

16. The safety system for use with a vehicle, comprising:
   power terminals for coupling to a battery;
   a brake signal indicator attachable to an article wearable by a rider of the vehicle;
   a transmitter configured to provide an RF signal in response to a brake operation;
   a pulse signal circuit coupled to the power terminals, the pulse signal circuit generating a pulse signal;
   a receiver, coupled with the brake signal indicator and coupled with the pulse signal circuit and powered by the pulse signal, the receiver generating a control signal in response to the RF signal; and
   wherein the brake signal indicator provides indicia of the brake operation in response to the control signal and wherein the pulse signal is provided by the pulse signal circuit in response to an absence of the control signal and a DC signal is provided by the pulse signal circuit in response to the control signal, whereby power consumption of the receiver is reduced by powering the receiver with the pulse signal.

17. The system of claim 16, wherein the brake signal indicator further comprises:
   LED means for providing light in response to the control signal.

18. The system of claim 16, wherein the brake signal indicator further comprises a lens having a plurality of spherical indentations.

19. The system of claim 16 further including an attachment means for providing a housing wherein the brake signal indicator and the attachment means is mounted to the article.

20. The system of claim 16, wherein the vehicle includes a brake light and the transmitter is coupled to the brake light so that the transmitter provides the RF signal when the brake light is turned on.

* * * * *

UNITED STATES PATENT AND TRADEMARK OFFICE
CERTIFICATE OF CORRECTION

PATENT NO. : 5,353,008
DATED : 10/04/1994
INVENTOR(S) : Eikenberry, et al.

It is certified that error appears in the above-identified patent and that said Letters Patent is hereby corrected as shown below:

Claim 1, at Column 12, line 7, please delete "-".

Claim 3, at Column 12, line 32, please delete "a" and insert therefor --the--.

Claim 3, at Column 12, line 32, please delete "power".

Claim 4, at Column 12, line 35, please delete "(Amended)".

Claim 4, at Column 12, line 36, please delete "power signal".

Claim 7, at Column 12, line 44, before "duty" insert --a--.

Claim 7, at Column 12, line 41, please delete "Art" and insert therefor --An--.

Claim 7, at Column 12, line 54, please delete the second instance of "the" and insert therefor --a--.

Claim 7, at Column 12, line 60, before "lens" insert --a--.

Claim 16, at Column 13, line 17, please delete "The" and insert therefor --A--.

Signed and Sealed this

Twentieth Day of February, 2001

Attest:

NICHOLAS P. GODICI

Attesting Officer    Acting Director of the United States Patent and Trademark Office